Figure 1:
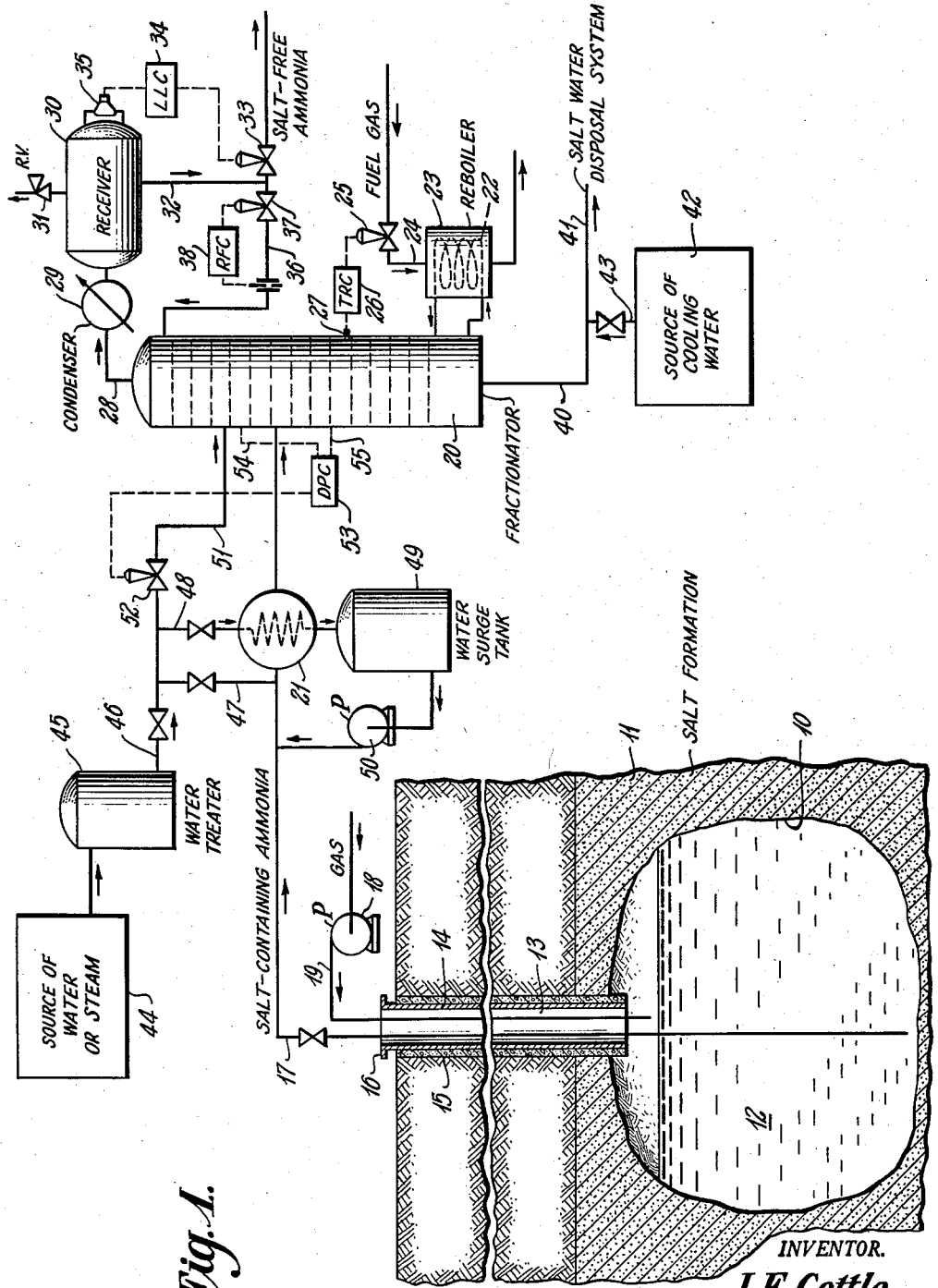

INVENTOR.
J. E. Cottle

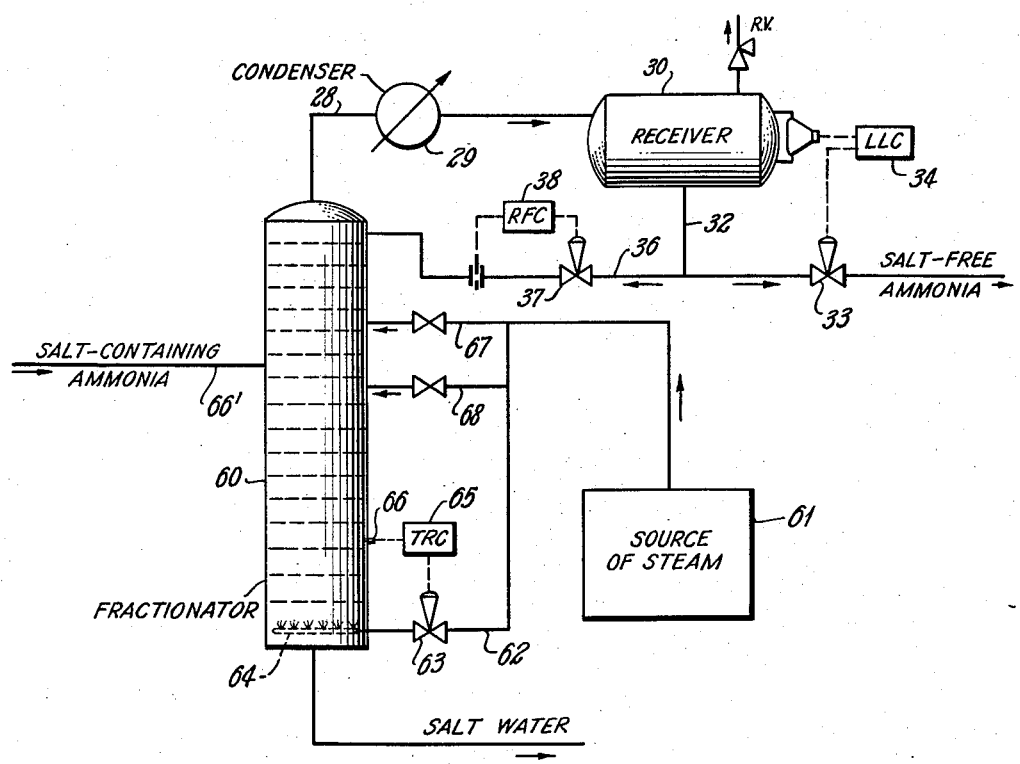

United States Patent Office 2,878,165
Patented Mar. 17, 1959

2,878,165

AMMONIA STORAGE AND RECOVERY SYSTEM

John E. Cottle, Bartlesville, Okla., assignor to Phillips Petroleum Company, a corporation of Delaware Application November 16, 1953, Serial No. 392,359

16 Claims. (Cl. 202—39.5)

This invention relates to a method of and system for separating ammonia from dissolved salts contained therein. In another aspect, it relates to a system for the storage of ammonia in an underground cavern formed in a salt formation, and recovery of the stored ammonia in a substantially anhydrous condition.

With the increasing cost of surface storage facilities for fluid material, particularly ammonia, various methods of storing such fluids underground have been proposed which will afford more economic storage than surface equipment. One of the most economical systems for underground storage of ammonia involves the formation of underground cavern in a salt bed, since the cavern can be formed by dissolving the salt with water, and the cavern, when formed, is quite stable and free from water seepage.

However, it has been found that the ammonia, when so stored, dissolves a certain amount of salt, this salt being very undesirable in certain uses of the ammonia recovered from the storage cavern. The amount of salt usually ranges from about 1 percent to 10 percent by weight, a typical stream recovered from such an underground storage unit containing 5 weight percent salt, substantially all of which is sodium chloride.

In accordance with this invention, the ammonia recovered from the storage facilities is treated in a novel manner to separate the salt from the ammonia and recover the latter in substantially anhydrous form. Inasmuch as a salt-ammonia system has an inverse solubility curve, i. e., the amount of salt held in solution decreases, rather than increases, with increase in temperature, a simple vaporization of the salt-containing stream is not successful due to extensive deposition of salt upon the separation equipment. I have provided a fractionation system particularly suited for the separation of salt from ammonia recovered from an underground storage cavern formed in a salt formation, which system is not subject to the deposition of salt upon the separation equipment.

Accordingly, it is an object of the invention to provide an improved system for the storage of ammonia in salt caverns and the recovery of ammonia therefrom.

It is a further object to provide a fractionation system for the recvovery of ammonia in substantial anhydrous form from a stream of ammonia containing dissolved salt, without deposition of the salt upon the fractionation equipment.

It is a still further object to provide such a system wherein few units are required for the separation, and the units are of an inexpensive type so that the installation can be located closely adjacent the storage zone.

It is a further object to prevent the formation of organic ammonium compounds, such as carbamates, during the separation, and to provide a convenient system for the disposal of brine formed in the separation step without clogging of or salt deposition on the disposal system.

Various other objects, advantages and features of the invention will become apparent from the following detailed description taken in conjunction with the accompanying drawings, in which:

Figure 1 is a flow diagram of an ammonia storage system constructed in accordance with the invention; and Figure 2 is a flow diagram of a modified fractionation system.

Referring now to Figure 1, I have shown an underground cavern 10 formed in a subterranean salt formation 11, this cavern containing a body 12 of stored ammonia. The cavern 10 communicates with the surface through a shaft 13 in which is mounted a liner 14 secured in place by a mass of cement 15. At the surface, liner 14 is sealed by a well head 16, the ammonia being withdrawn through a valved line 17 extending to a position close to the bottom of the cavern by gas introduced into the upper part of the cavern by a pump 18 and a line 19. This gas can be overhead product from the ammonia distillation tower hereinafter described. Ammonia to be stored can be pumped into the cavern by unit 18 or, alternatively, it can flow into the cavern by gravity through the line 17.

During the storage period, a certain amount of salt from formation 11 is dissolved in the liquid ammonia, a typical ammonia stream withdrawn from storage containing 5 weight percent salt. The salt concentration will usually be within the limits of 1 to 10 percent by weight.

In some embodiments of the invention, the ammonia containing dissolved salt is fed at room temperature directly to a selected tray of a fractionation column 20 while, in other embodiments of the invention, the feed passes through a preheater 21 before entering the column, the feed thereby being heated to a temperature within the range of 90 to 160° F.

In the fractionation column, suitable conditions are maintained for the separation of anhydrous ammonia from salt water, the water being introduced in the manner hereinafter described. Suitable conditions are a top temperature of 110° F., a bottom temperature of 410° F., and a column pressure of 235 pounds per square inch gauge. Where the duty of the fractionator is of the order of 170 tons per day of ammonia (approximately 45 gallons per minute), fractionator 20 can be suitably provided with 14 to 20 bubble cap trays with a tray spacing of 24 inches, a column diameter of 3 feet 10 inches and a column length of 45 feet. In some cases, a packed column can be used.

The foregoing conditions of temperature and pressure are maintained in the embodiment of Figure 1 by withdrawing a portion of the bottoms product and passing it through a system of coils 22 in a reboiler 23. The material within the tubes is heated by a fuel mixture fed to the reboiler from a supply line 24 under the control of an automatic valve 25. The heated liquid from the reboiler then passes into the bottom of the column.

Valve 25 is regulated by a temperature recorder controller 26 which has a temperature sensitive element or device 27 at a selected tray of the column, preferably several trays above the kettle and at least several trays below the feed inlet. Controller 26 actuates the valve 25 which, in turn, regulates the heat supply to the bottom of the column so as to maintain a constant temperature at sensing device 27.

The aforesaid conditions within the column are also maintained by withdrawing overhead product through a line 28 from which it passes to a condenser 29, the condensate then flowing to a receiver 30. The top of receiver 30 communicates with the atmosphere through a relief valve 31 which cooperates with the other parts of the system to maintain a constant column pressure. Receiver 30 has an outlet line 32 from which the liquid product, substantially anhydrous salt-free ammonia, is withdrawn.

A control valve 33 is located in line 32, and this valve is actuated by a liquid level controller 34 having a level sensing element 35 connected to the receiver, the action being to control the rate of withdrawal of product so as to maintain a constant liquid level in the receiver. A branch line 36 extends from conduit 32 to the top of the column and supplies reflux thereto, the line 36 including an automatic valve 37 actuated by a rate of flow controller 38 so as to maintain a constant rate of flow through the reflux line.

Salt water is withdrawn as a bottoms product through a conduit 40 which extends to a remote salt water disposal system indicated generally by reference numeral 41. Adjacent the fractionator 20, a source 42 of cooling water is connected to the conduit 40 by a valved line 43. It is a feature of the invention that the cooling water thus introduced not only cools the kettle product from the kettle temperature of approximately 400° F. to a safe handling temperature but also dilutes the salt water withdrawn from the column to such an extent that no salt deposition with resulting plugging occurs in conduit 40 or in the salt water disposal system 41.

With the separation as thus far described, it is clear that salt from the ammonia stream would deposit out upon the trays and other parts of the fractionation equipment when heat was supplied to the fractionator, by virtue of the inverse solubility curve of the ammonia-salt system. In accordance with the invention, a controlled amount of water in the fluid state, i. e., either liquid water or steam, is introduced to the fractionation column adjacent the feed entry tray so as to prevent salt deposition. To this end, I have shown a source 44 of water which passes through a water treater 45 to a valved conduit 46.

In the treater unit 45, the water is freed of insoluble salts, such as calcium salts, and all carbonate ions are removed. In addition, the treated water has a negligible solids content. This water treatment is quite important, in accordance with the invention, in that it prevents the deposition of insoluble salts of calcium and the like upon the trays and other parts of the fractionation equipment. Moreover, the removal of carbonates from the water is an important feature, as I have found that carbonates introduced into the fractionation zone react with the ammonia to form organic carbamates, thus resulting in loss of ammonia and presence of undesirable organic constituents in the resulting product. This is avoided by the described water treatment.

The water or steam thus treated can be introduced into the fractionation zone in several ways. For example, the water from conduit 46 can be admixed with the feed to the column by passing it through a valved conduit 47. Alternatively, and preferably, steam from conduit 46 is passed through a valved conduit 48 to the feed preheater 21 wherein the steam is condensed and the feed is heated to a suitable temperature for introduction into the column. The resulting condensate from unit 21 is fed to a surge tank 49 and, thence, passes through a pump 50 to the inlet line 17.

Another very advantageous method of introducing the water is to pass it to a tray close to the feed tray through a conduit 51 incorporating an automatic control valve 52. Preferably, water is introduced in this manner at a location two or three trays above the feed entry so that the water, in passing downwardly through the column, washes off any salt that may be deposited upon the bubble caps. However, by the term "tray or location adjacent the feed entry" in the appended claims, I intend to cover the introduction of water or steam through a line, such as line 51, at any tray where salt from the feed may be deposited.

In some cases, it is very advantageous to automatically control the amount of water fed to the column. To this end, I have shown a differential pressure controller 53 having pressure-responsive elements 54 and 55 at spaced vertical points in the fractionation column 20. These elements determine the pressure drop between two trays adjacent the feed entry in the sense described above, i. e., two trays between which salt deposition from the feed can occur. The controller 53 is operatively connected to automatic valve 52 and increases the amount of water fed to the fractionator when the pressure difference between the units 54 and 55 exceeds a predetermined value. It has been found that salt deposits, when they occur, are most frequently located at the slots where the ascending gases pass through the bubble caps and the liquid on the trays. Such salt deposition increases the pressure drop through the trays concerned and, in accordance with the invention, this increase in pressure drop causes more water to be introduced to the column to wash away the salt deposits. It will be evident that the differential recorder controller 53 can be operatively connected to automatic control valved line 47 or 48 where the water or steam is introduced through one of the latter lines.

It will be evident, from the foregoing description, that a low cost, efficient, and practical system is provided for recovering substantially anhydrous ammonia free of salt from storage caverns formed in salt formations.

In Figure 2, I have shown a modification of the invention where the heat is supplied to the fractionation column in the form of steam, and steam is also introduced to one or more trays of the column adjacent the feed entry. In this figure, I have shown a fractionation column 60 having an overhead condenser, receiver, and associated components similar to those described in connection with Figure 1 and indicated by like reference numerals.

The column 60 is not provided with a reboiler, heat being supplied to the column by steam introduced from a source 61, to a steam line 62 incorporating an automatic valve 63 and a distribution ring 64 at the bottom of the column. A temperature recorder controller 65 is operatively connected to valve 63 and has a temperature sensing element 66 disposed in the column at least several trays above the kettle, and at least several trays below the feed entry location. This controller regulates the amount of steam fed to the bottom of the column so as to maintain suitable fractionation conditions therein.

A stream of salt-containing ammonia is fed to an intermediate tray of the column through a line 66', and conditions are maintained within the column as described in connection with Figure 1 which are suitable for the separation of anhydrous ammonia from salt water.

In accordance with the invention, steam from source 61 is passed through either or both of valved lines 67 and 68 to a tray of the fractionation column adjacent the feed entry. This steam prevents the deposition of salt upon the fractionation equipment, and also supplies a portion of the heat necessary to operate the column. Thus, the valves in lines 67 and 68 can be regulated to supply the proper amount of steam to the intermediate part of the column to wash away any salt deposits formed and to prevent the formation of additional salt deposits, the controller 65 automatically regulating the additional steam supplied to the bottom of the column so as to maintain proper fractionation conditions. In this manner, the ammonia is readily recovered in a salt-free substantially anhydrous state, and deposition of salt upon the fractionation equipment is effectively prevented. It will be understood that the fractionation column 60 cooperates with the other parts of the ammonia storage and recovery system in the manner indicated in connection with the fractionator 20 of Figure 1.

While the invention has been described in connection with a present, preferred embodiment thereof, it is to be understood that this description is illustrative only and is not intended to limit the invention.

I claim:

1. The method of separating substantially anhydrous ammonia from salt which comprises introducing ammonia containing dissolved salt into a fractionation zone, withdrawing anhydrous ammonia overhead from said fractionation zone, withdrawing salt water as a bottoms product from said fractionation zone, and introducing water in a fluid state into the fractionation zone at a point above the point of introducing said ammonia to facilitate the separation and prevent deposition of salt within the fractionation zone.

2. The method of separating substantially anhydrous ammonia from salt which comprises introducing ammonia containing dissolved salt into a fractionation zone, withdrawing anhydrous ammonia overhead from said fractionation zone, withdrawing salt water as a bottoms product from said fractionation zone, and introducing treated water substantially free from insoluble salts and carbonates in a fluid state into the fractionation zone at a point above the point of introducing said ammonia to facilitate the separation and prevent deposition of salt within the fractionation zone.

3. A system for separating substantially anhydrous ammonia from salt dissolved therein which comprises, in combination, a fractionation column having a plurality of trays, a reboiler comprising a series of tubes, means connecting said tubes to the kettle of said fractionator, a valved line for admitting a fuel mixture to said reboiler to supply heat to said tubes, an overhead condenser connected to the top of said column, a receiver fed by said overhead condenser, a valved outlet line connected to said receiver, a liquid level controller operatively connected to the valve in said last-mentioned line and having a level sensing element in said receiver to maintain a constant level therein, a line branching from said outlet line and extending to the top of said fractionation column, a rate of flow controller operatively connected in said branch line, a temperature controller having a sensing element at an intermediate tray of said column and operatively connected to the valve in said fuel mixture line, said temperature controller being operative to maintain a predetermined temperature in said intermediate tray through control of the amount of fuel mixture fed to the reboiler, a line for introducing ammonia containing dissolved salt to an intermediate tray of said column, a source of water in the fluid state, means for supplying water from said source to a tray of said column above the feed tray, and means for regulating the quantity of water so supplied to prevent deposition of salt upon the fractionation equipment.

4. A system for separating substantially anhydrous ammonia from salt dissolved therein which comprises, in combination, a fractionation column having a plurality of trays, a reboiler comprising a series of tubes, means connecting said tubes to the kettle of said fractionator, a valved line for admitting a fuel mixture to said reboiler to supply heat to said tubes, an overhead condenser connected to the top of said column, a receiver fed by said overhead condenser, a valved outlet line connected to said receiver, a liquid level controller operatively connected to the valve in said outlet line and having a level sensing device in said receiver to maintain a constant level therein, a line branching from said outlet line and extending to the top of said fractionation column, a rate of flow controller operatively connected in said branch line, a temperature controller having a sensing element at an intermediate tray of said column and operatively connected to the valve in said fuel mixture conduit, said temperature controller being operative to maintain a predetermined temperature in said intermediate tray through controller to the amount of fuel mixture fed to the reboiler, a line for introducing ammonia containing dissolved salt to an intermediate tray of said column, a source of water in the fluid state, means for supplying water from said source to a tray of said column above the feed tray, a differential pressure controller operatively connected to said water-supplying means and having pressure-sensing elements connected to spaced trays of said fractionator adjacent the feed entry tray, said controller regulating the amount of water fed to the column so as to maintain a constant pressure differential between said pressure-sensing elements, a conduit connected to the kettle of said column to withdraw salt water therefrom, said conduit extending to a salt water disposal system, a source of cooling water, and means for supplying cooling water from said source to said last-mentioned conduit at a region adjacent the column so as to prevent deposition of salt in said conduit.

5. A system for separating substantially anhydrous ammonia from salt dissolved therein which comprises, in combination, a fractionation column having a plurality of trays, a source of high pressure steam, a valved conduit for supplying steam from said source to the bottom of said column, a temperature controller operatively connected to the valve in said steam line and having a temperature sensing element located at an intermediate tray of said column, said controller regulating the steam supplied so as to maintain a predetermined temperature at said intermediate tray, an overhead condenser connected to the top of said column, a receiver for collecting condensate from said condenser, an outlet conduit connected to said receiver, a liquid level controller operatively connected to a valve in said outlet conduit and having a level sensing device in said receiver, said controller maintaining a constant liquid level in the receiver, a branch line extending from said outlet conduit to the top of the column, a rate of flow controller in said branch line, a line for admitting ammonia containing dissolved salt to a selected tray of said column, a steam line connected to a tray above said selected tray and to said source of steam, and means for regulating the amount of steam supplied to said last-mentioned line so as to prevent the deposition of salt upon the fractionation equipment, said temperature controller automatically varying the amount of steam fed to the bottom of the fractionator so as to maintain a correct heat balance in said fractionator despite variations in the amount of material passing through said steam line.

6. A method of separating substantially anhydrous ammonia from salt which comprises introducing ammonia containing dissolved salt into a fractionation zone, withdrawing anhydrous ammonia overhead from said fractionation zone, withdrawing salt water as a bottoms product from said fractionation zone, passing steam treated to remove insoluble salt and carbonates in indirect heat exchange relationship with the feed to the fractionation zone, thereby to heat the feed and condense the steam, and introducing condensate thus formed into said fractionation zone at a point above the point of introducing said ammonia, thereby introducing water into the fractionation zone in sufficient quantity to prevent salt deposition.

7. A method of separating substantially anhydrous ammonia from salt which comprises introducing ammonia containing dissolved salt into a fractionation zone at a feed region, injecting high pressure steam into said fractionation zone at a point above the point of introducing said ammonia in sufficient quantity as to prevent deposition of salt within the fractionation zone, withdrawing substantially anhydrous ammonia overhead from said fractionation zone, withdrawing salt water from said fractionation zone as a bottoms product, supplying steam to the bottom of the column, and regulating the quantity of steam supplied at the bottom so that the total heat supplied to the column by all of the steam provides conditions within the fractionation zone suitable for the separation of anhydrous ammonia from salt water.

8. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, introducing water to said fractionation zone at an intermediate region thereof at a point above the point of feed introduction, withdrawing substantially anhydrous ammonia from the top of the zone, and withdrawing salt water from the bottom of the zone.

9. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, introducing water to a region of said fractionation zone intermediate the region of said introduction and the top of the zone at such a rate as to prevent deposition of salt within the fractionation zone upon the fractionation equipment, withdrawing substantially anhydrous ammonia from the top of the zone, and withdrawing salt water from the bottom of the zone.

10. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, supplying water to an intermediate region of the fractionation zone at a point above the point of introducing said ammonia to said fractionation zone in such amount as to prevent deposition of salt within the fractionation zone upon the fractionation equipment, withdrawing substantially anhydrous ammonia from the top of the zone, and withdrawing salt water from the bottom of the zone.

11. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, supplying water to an intermediate region of the fractionation zone at a point above the point of introducing said ammonia to said fractionation zone in such amount as to prevent deposition of salt within the fractionation zone upon the fractionation equipment, withdrawing substantially anhydrous ammonia from the top of the zone, withdrawing salt water from the bottom of the zone, passing the ammonia withdrawn from the cavern in indirect heat exchange with steam to heat it to the temperature of the fractionation zone at the region of feed introduction, whereby a portion of the steam is condensed, and utilizing said condensate as the water fed to said fractionation zone.

12. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, introducing water to said fractionation zone at an intermediate region thereof above the point of feed introduction, withdrawing substantially anhydrous ammonia from the top of the zone, withdrawing salt water from the bottom of the zone, producing an output representative of the differential pressure between selected regions of said fractionation zone which are subject to salt deposition thereon, and controlling the amount of water fed to the fractionation zone in accordance with said output so as to maintain said output at a constant predetermined value.

13. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, supplying steam to the fractionation zone at a point above the point of feed introduction at such rate as to prevent deposition of salt within the fractionation zone upon the fractionation equipment, withdrawing substantially anhydrous ammonia from the top of the zone, and withdrawing salt water from the bottom of the zone.

14. The method of storing and recovering ammonia which comprises introducing ammonia into a storage cavern formed in a subterranean salt formation, withdrawing ammonia containing dissolved salt from said cavern and feeding it to an intermediate region of a fractionation zone, supplying heat to the bottom of said zone and withdrawing heat from the top of said zone so as to maintain conditions therein suitable for the separation of anhydrous ammonia from salt water, introducing water to said fractionation zone into an intermediate region thereof at a point above the point of feed introduction, withdrawing substantially anhydrous ammonia from the top of the zone, withdrawing salt water from the bottom of the zone, adding water to the bottom product from the fractionation zone to cool the same and decrease the salt concentration thereof, and passing the mixture of water and bottoms product along a path of extended length to a disposal system.

15. The method of separating substantially anhydrous ammonia from salt dissolved therein which comprises feeding ammonia containing dissolved salt to an intermediate region of a fractionation zone, supplying heat to the bottom of the fractionation zone and withdrawing heat from the top of the fractionation zone so as to provide conditions suitable for the separation of anhydrous ammonia from salt water, introducing water in a fluid state into an intermediate region of said fractionation zone at a point above the point of feeding ammonia to said fractionation zone to prevent deposition of salt within the fractionation zone upon the fractionation equipment, withdrawing substantially anhydrous ammonia overhead from the zone, and withdrawing salt water from the bottom of the zone.

16. The method of separating substantially anhydrous ammonia from salt dissolved therein which comprises feeding ammonia containing dissolved salt to an intermediate region of a fractionation zone, supplying heat to the bottom of the fractionation zone and withdrawing heat from the top of the fractionation zone so as to provide conditions suitable for the separation of anhydrous ammonia from salt water, introducing water in a fluid state into an intermediate region of said fractionation zone at a point above the point of feeding ammonia to said fractionation zone to prevent deposition of salt within the fractionation zone upon the fractionation equipment, withdrawing substantially anhydrous ammonia overhead from the zone, withdrawing salt water from the bottom of the zone, producing an output representative of the pressure differential between spaced intermediate regions of said zone where salt deposition is encountered, and regulating the amount of water introduced to the fractionation zone in accordance with said output so as to maintain said output at a constant predetermined value.

References Cited in the file of this patent

UNITED STATES PATENTS

| | | |
|---|---|---|
| Re. 10,725 | Hendrick | May 18, 1886 |
| 342,722 | Wren | May 25, 1886 |
| 586,950 | Frerichs | July 20, 1897 |
| 1,455,299 | Marquard et al. | May 15, 1923 |
| 2,012,621 | Bennett | Aug. 27, 1935 |
| 2,029,467 | Day | Feb. 4, 1936 |
| 2,184,923 | Haltmeier | Dec. 26, 1939 |
| 2,389,244 | Whaley | Nov. 20, 1945 |
| 2,415,192 | Rittenhouse | Feb. 4, 1947 |
| 2,444,175 | Teter et al. | June 29, 1948 |
| 2,445,255 | Younkin | July 13, 1948 |
| 2,458,902 | Fitzhugh et al. | Jan. 11, 1949 |
| 2,459,227 | Kerr | Jan. 18, 1949 |
| 2,580,651 | Boyd | Jan. 1, 1952 |
| 2,590,066 | Pattinson | Mar. 18, 1952 |
| 2,620,294 | Carlson | Dec. 2, 1952 |
| 2,647,078 | Chambers | July 28, 1953 |
| 2,677,666 | Dougherty | May 4, 1954 |
| 2,713,775 | Cottle | July 26, 1955 |

OTHER REFERENCES

"Propane Transportation and Storage . . .," Boyd et al., "The Petroleum Engineer, Reference Annual, 1954," pp. D-26, 28-30.

UNITED STATES PATENT OFFICE
CERTIFICATE OF CORRECTION

Patent No. 2,878,165                                                             March 17, 1959

John E. Cottle

It is hereby certified that error appears in the printed specification of the above numbered patent requiring correction and that the said Letters Patent should read as corrected below.

Column 1, line 57, for "recvovery" read -- recovery --; column 5, lines 9 and 19, column 6, lines 52 and 53, lines 66 and 67, column 7, lines 9, 23, 39, and 55, and column 8, lines 1, 20, and 35, before "ammonia", each occurrence, insert -- liquid --; column 7, line 30, after "introduction" insert -- of said ammonia --; column 9, list of references cited, under the heading "UNITED STATES PATENTS", insert 1,923,896     Trump - - - - Aug. 22, 1933

Signed and sealed this 23rd day of February 1960.

(SEAL)
Attest:

KARL H. AXLINE                                               ROBERT C. WATSON
Attesting Officer                                            Commissioner of Patents